United States Patent [19]

Komeiji et al.

[11] Patent Number: 5,222,686
[45] Date of Patent: Jun. 29, 1993

[54] TAPE CASSETTE HAVING FRONT LID LOCKING MEMBER FIXED TO A LOWER HALF CASE

[75] Inventors: Masayuki Komeiji; Kimimoto Hirose, both of Tamaho; Souji Shinozaki; Nobuaki Takahashi, both of Hino, all of Japan

[73] Assignee: Konica Corporation, Tokyo, Japan

[21] Appl. No.: 653,693

[22] Filed: Feb. 11, 1991

[30] Foreign Application Priority Data

Feb. 16, 1990 [JP] Japan ............... 2-14398[U]

[51] Int. Cl.$^5$ .............................................. G11B 23/04
[52] U.S. Cl. ...................................................... 242/199
[58] Field of Search ................ 242/199, 198; 360/132

[56] References Cited

U.S. PATENT DOCUMENTS 4,608,616 8/1986 Wakui et al. .................. 242/199 X
4,786,012 11/1988 Ino et al. ............................ 242/198
4,915,322 4/1990 Schoettle et al. .................... 360/132

FOREIGN PATENT DOCUMENTS 0062877 4/1983 Japan ................................ 360/132
0229287 11/1985 Japan ................................ 360/132

Primary Examiner—Daniel P. Stodola
Assistant Examiner—John Rollins
Attorney, Agent, or Firm—Jordan B. Bierman

[57] ABSTRACT

In order to prevent the movement of a lock member for locking the front lid of a tape cassette, during assembly of the upper and lower half cases, the lock member is provided with two fitting positions including a first fitting member which fits into a corresponding complementary recess in the lower half case and a second fitting member which engages a corresponding step portion formed in the lower half case to effectively lock the lock member in place before assembly of the cassette.

2 Claims, 13 Drawing Sheets

FIG. I(A)
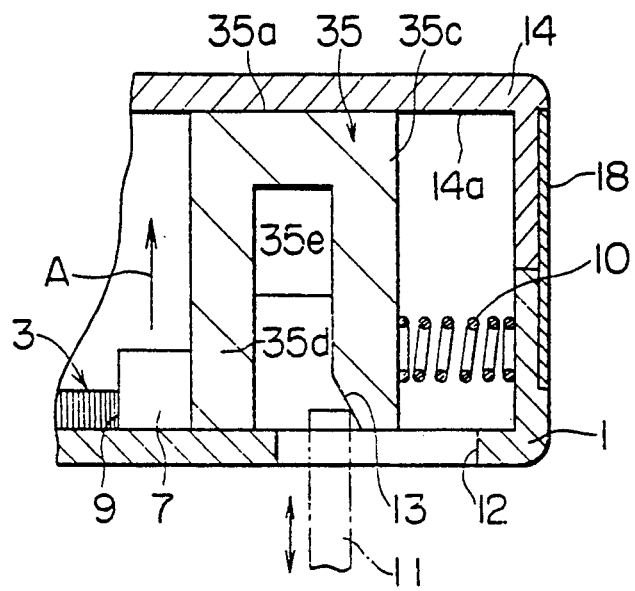
FIG.I(B)
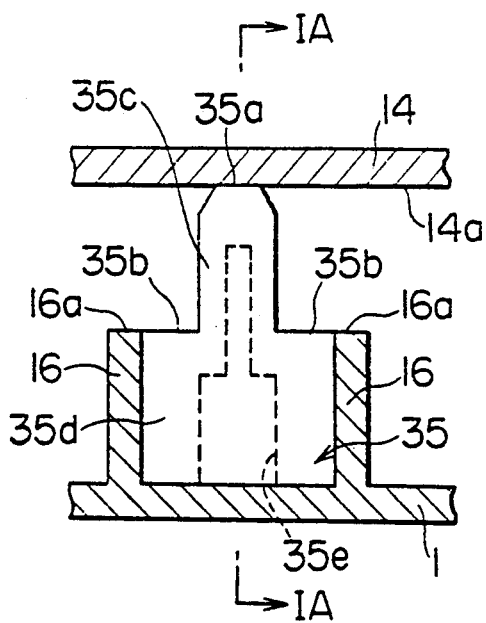
FIG.I(C)
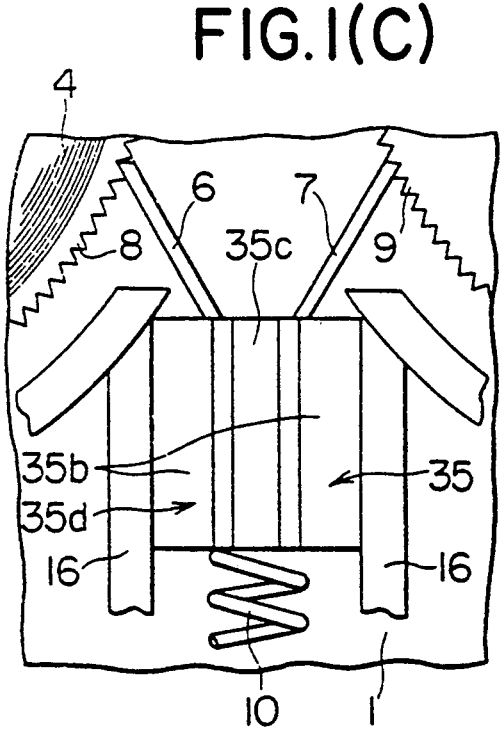

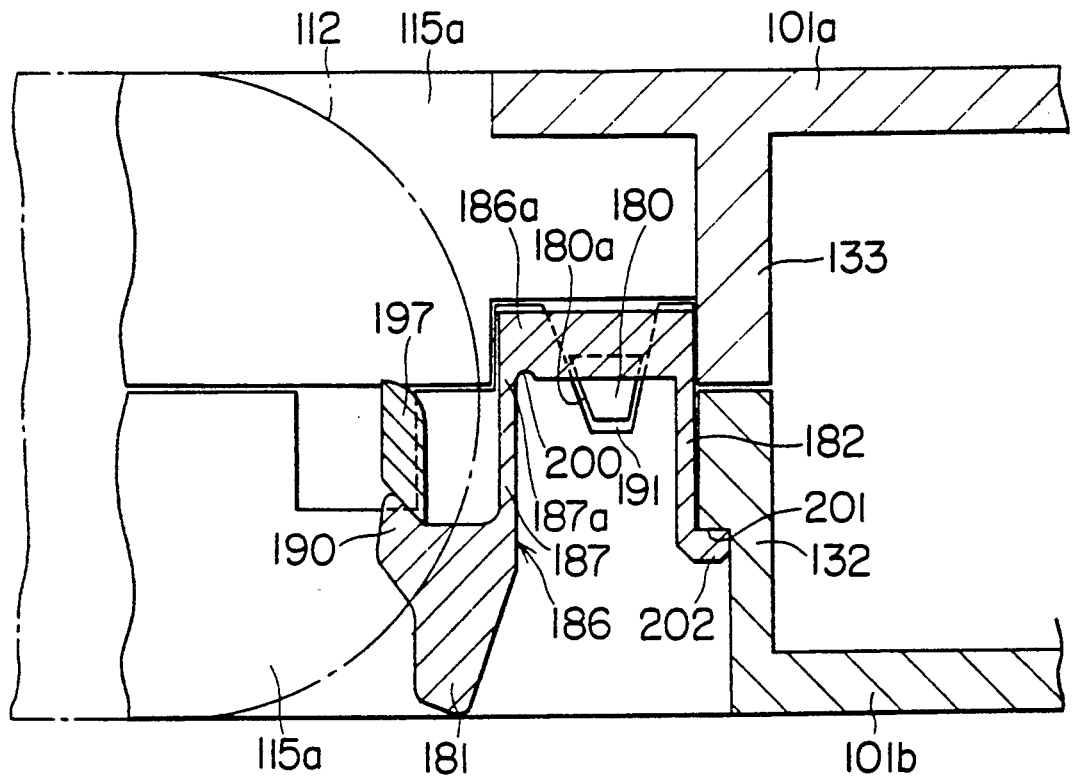
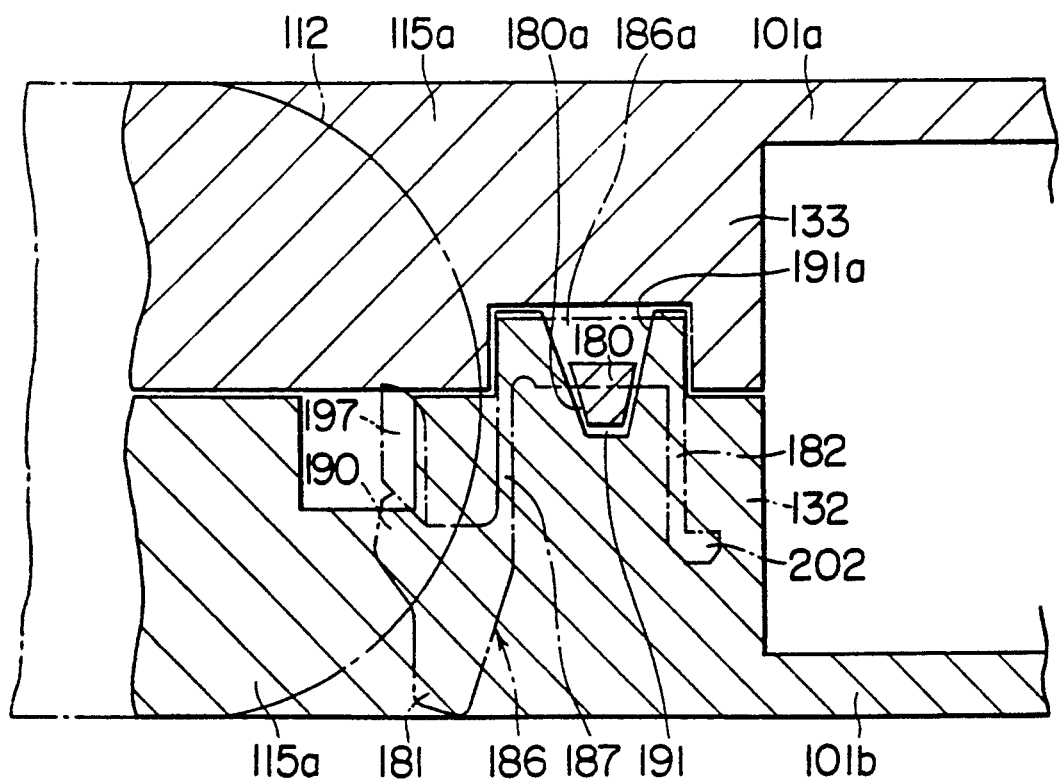

FIG. 14
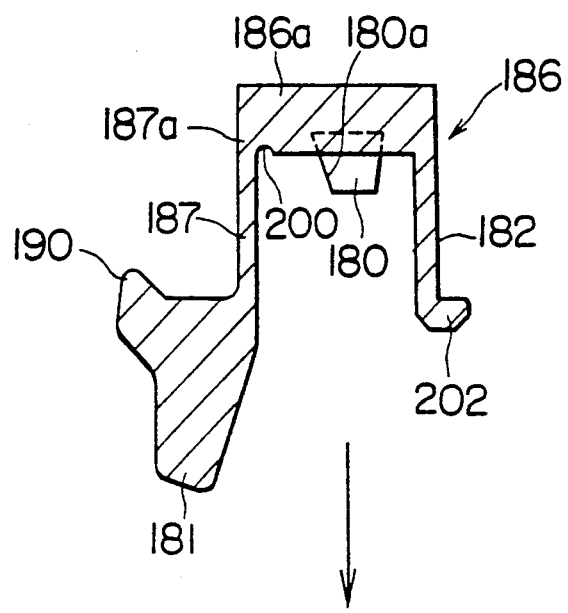
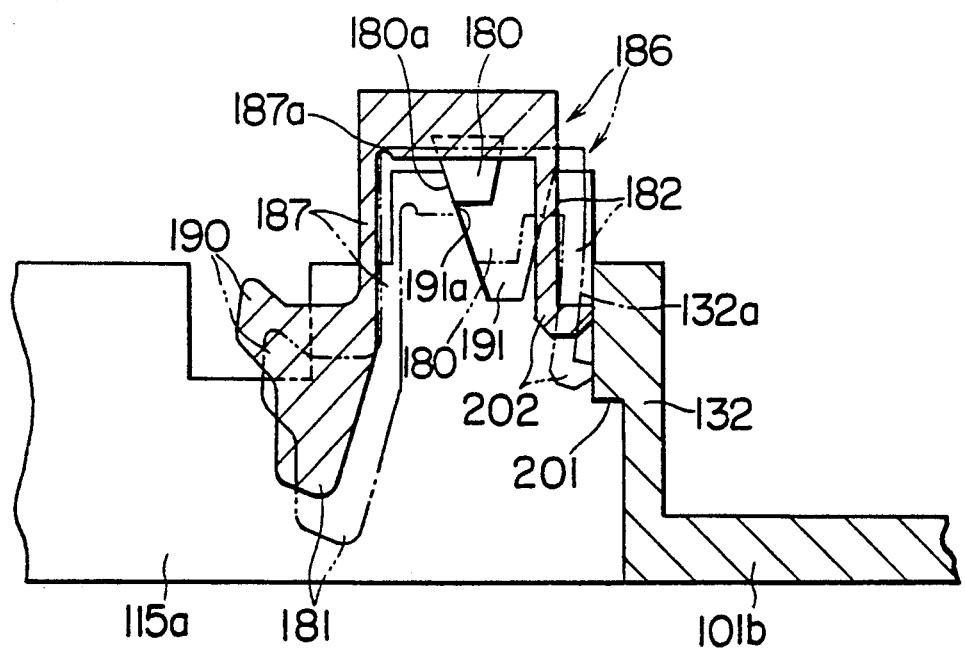

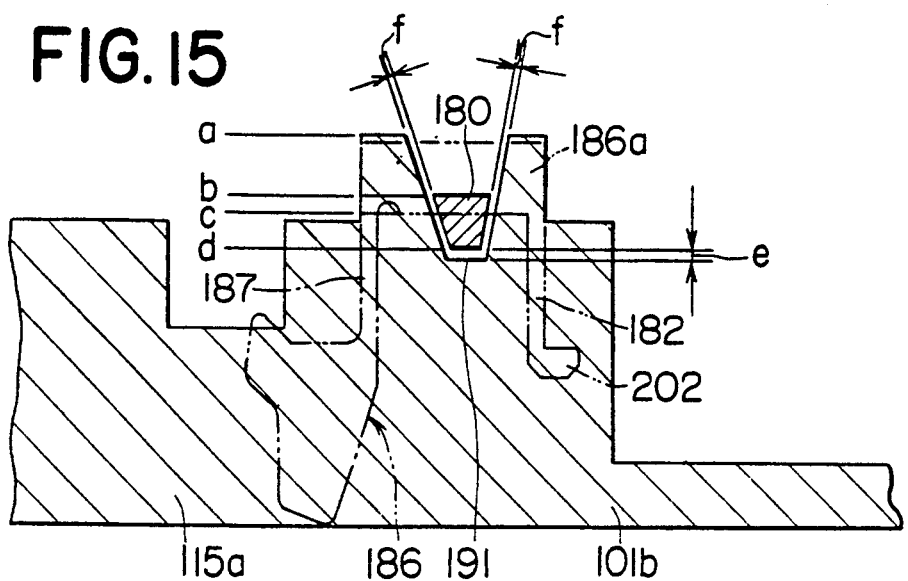
FIG. 15
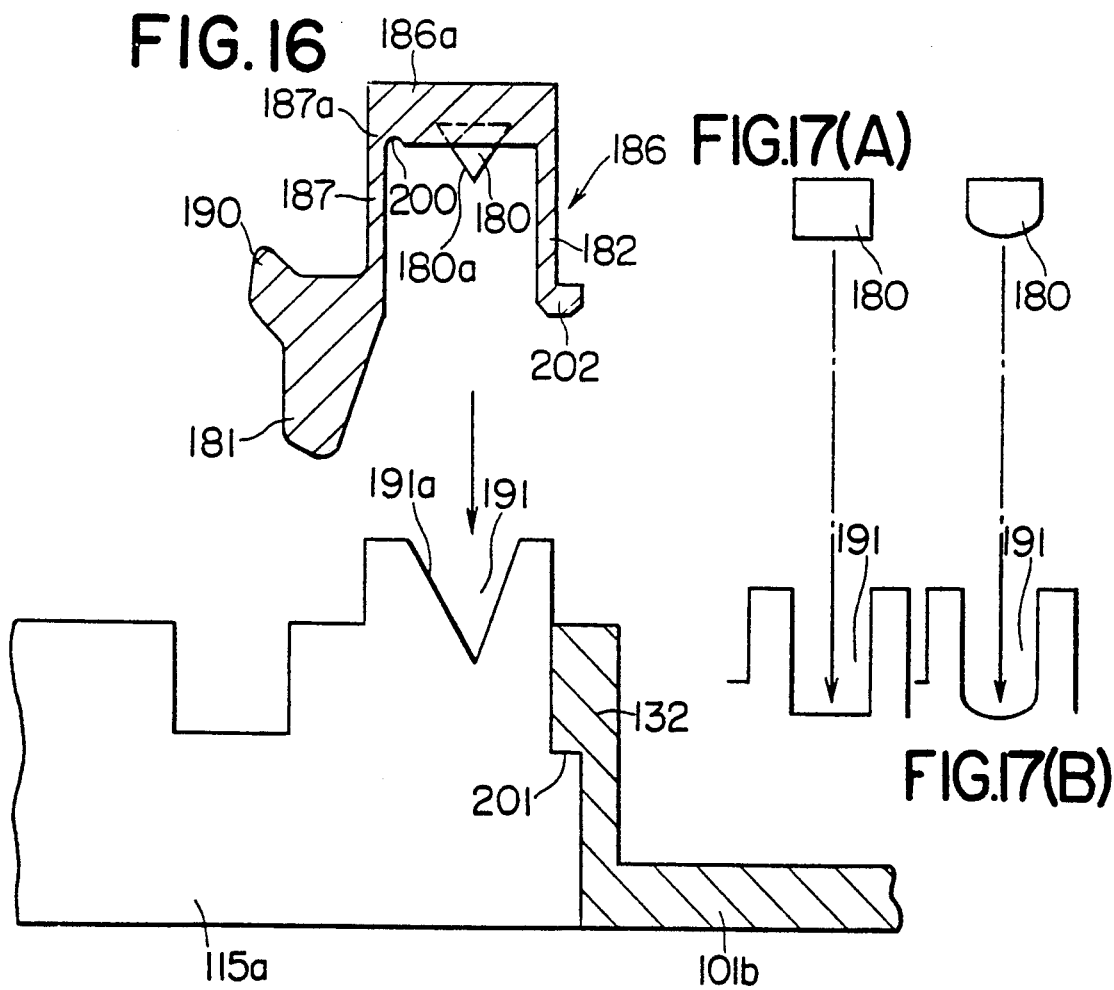
FIG. 16
FIG. 17(A)
FIG. 17(B)

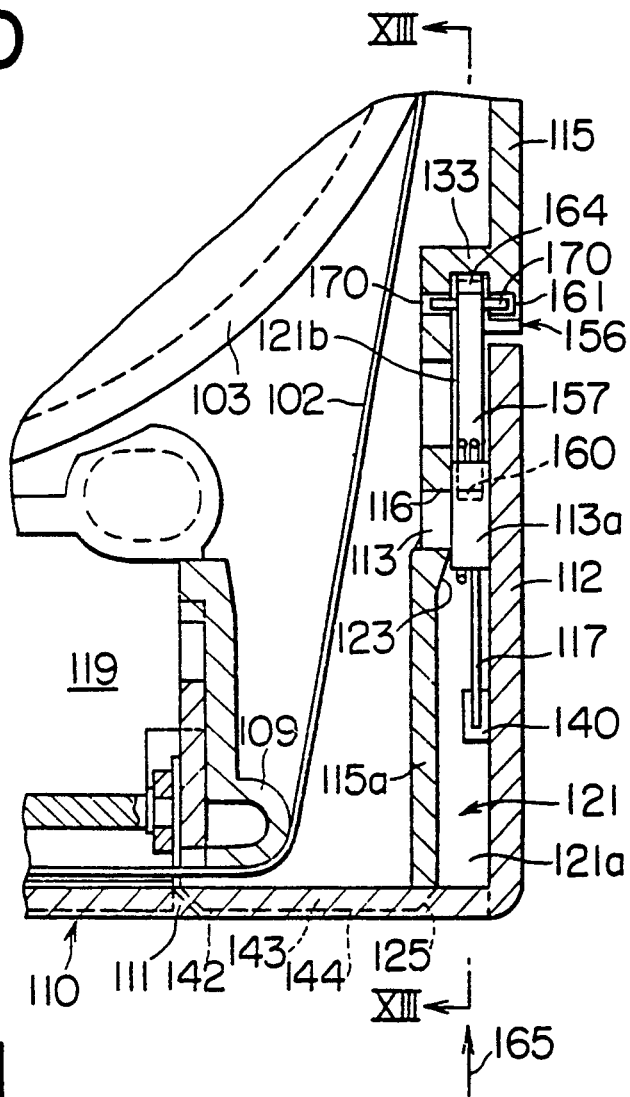
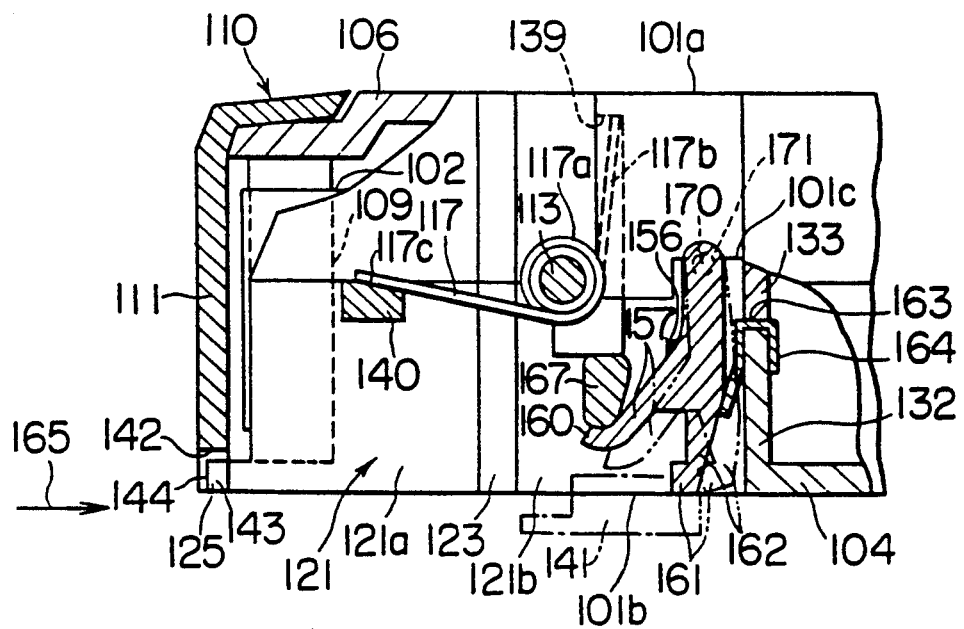

TAPE CASSETTE HAVING FRONT LID LOCKING MEMBER FIXED TO A LOWER HALF CASE

BACKGROUND OF THE INVENTION

The present invention relates to a tape cassette, and is particularly concerned with a video tape cassette for uses such as for 8 mm video tape recording.

A tape cassette shown in FIGS. 5 to 7 (detailed in Japanese Utility Model Application Laid-Open No.118180/1984) is known for use such as 8 mm video tape recording. These figures show the lower half case 1 of this cassette where a magnetic tape 4 passes between a pair of tape reels 2 and 3 through the front of the cassette. In this front, a front cover 110 (actually installed in the upper half case but not shown in the figure). The rear part of the cassette is constructed to keep the tape reels 2 and 3 at a stop while they are not in operation in a way that they may be locked by engaging the reel locking pawls 6 and 7 with the teeth 8 and 9 provided at the periphery of the flange of the tape reels letting the flat upper surface 5a of a reel lock 5 slide on the upper half case inner surface.

FIGS. 6, 7(A) and 7(B) each show the reel lock 5 and its surroundings. FIG. 6 is a cross section taken on line VI—VI of FIG. 5, and FIGS. 7(A) and 7(B) each a cross section taken on line VII—VII of FIG. 5.

The reel lock 5 is installed so that it may slide along a guide ribs 16 in a level in the front or rear direction in the cassette. On its front, the above-mentioned reel locking pawls 6 and 7 are mounted projectingly, and between its rear side and the back side of the lower half 1, a compression spring 10 is provided. Therefore, the reel lock 5 is constantly pressed toward the front of the cassette, and the locking pawl 7 engages with the tape reel teeth 9. When locking is released, a release pin 11 as shown by the hypothetical line in FIG. 6 is inserted through a hole 12 to hit a slant face 13. As a result of this, the lock 5 is forcedly moved to the right direction of the figure (towards the rear of the cassette), pressing the spring 10, and the locking pawl 7 disengages from the tooth 9. Incidentally, the numeral 14 denotes the upper half case of the cassette, and 18 a label glued to the back side of the cassette.

In this mechanism of reel locking, to prevent the lock 5 from rising, that is, slipping upward, the lock 5 is retained by keeping the flat upper surface 5a of the lock on the retaining rib 15 located on the upper half case 14. In an example shown in FIG. 7(A) of the mechanism, one such retaining rib is provided, while another example shown in FIG. 7(B) has two.

On account of the above, it has been necessary with the conventional cassette to mold the retaining rib 15 as part of the upper half case 14, and this causes what is called a sink mark to come up on the front surface of the upper half case 14, leading to an impairment of the appearance of the cassette and a lowering of its commercial value.

On the other hand, the inventor of the present invention has improved the above tape cassette and made this improvement public in Japanese Utility Model Application Laid-Open No. 177479/1989. FIG. 8(A) shows a reel lock 25 which has a height that its upper surface 25a may reach the inner surface 14a of the upper half case 14. Since the upper surface 25a of the reel lock 25 contacts with the inner surface 14a of the upper half case, this improved tape cassette prevents the reel lock 25 from slipping upward and so ensures stopping the rotation of the tape reels or releasing such locking. The elimination of the above-mentioned rib or ribs 15, resulting in flatness in and around the above-noted area with which the reel lock upper side is in contact, prevents sink marks from coming out and impairing the appearance after molding of the upper half case 14, thus implementing a good appearance and enhancing the commodity value.

In the course of further examination and analysis of this improvement, it has been found that the tape cassette still has a problem to cope with. Because the lock 25 in this tape cassette is made so that its upper surface is flat to be in slidable contacting with the inner surface 14a of the upper half case 14, the lock 25 tends to be too large and heavy and has a high center of gravity which causes it to be unstable in movement.

It is therefore the chief object of the present invention to provide a tape cassette whose reel lock is light weight and small with the lower center of gravity so that the lock may be easy to assemble into the cases and ensure smooth movement to the inner surface of the upper half case which has no sink mark on the molded outer surface.

Now, the background of the present invention in relation to another object of the invention will be described.

FIGS. 18 to 22 (detailed in Japanese Patent Application Laid-Open No. 18268/1988) shows a prior art video tape cassette for use such as 8 mm video tape recording.

The case 101 of this tape cassette is made up of upper and lower cases (halves) 1a and 1b, and has a tape reel 103, located both right and left inside the case, for winding a magnetic tape 102. The tape reels 103 are upon the right and left holes 105 for insertion of driving shafts, and are pressed downward by a leaf spring 107 whose one end is fixed on the inner surface of the upper part 106 of the case 101.

To a case 101, a front lid 110 is attached rotatably for opening and closing the front of the case to protect tape. This front lid 110 has a front plate 111 for covering the entire front of the case 111, support plates (side part of the front plate) 112 provided at both the right and left ends of the front plate 111 extending to the back of the case and pivots 113 protruded from the supports 112 to face each other. The pivots 113 are inserted in the holes 116 formed in the front ends 115a of the right and left sides 115 of the case 101 (as shown in FIG. 20). The front lid 110 rotatably changes the position to open the front of the case 101 or to close it and vice versa, but a torsion spring 117 provided to a pivot 113 applies its force constantly to the lid so that it may rotate and return to the closing position usually. When the tape cassette is not in use, the front lid 110 is closed and locked to protect that part of the magnetic tape 102 which is guided to the front of the case. There is a space 121 between the right front side wall 115a of the case and the right side support plate 112 of the lid to face each other (this space may be provided at the left side), and in the space 121 a means 156 for locking the front lid 110 when it is closed is installed. When a tape cassette has been set into a video tape recorder, the locking releaser 141 provided to the recorder moves, in the direction and course shown by the arrows 165, into the space 121 from the front side of the case 101, reaches and pushes the locking means 156 and therefore releases the locking of the front lid 110. As a result, the front lid 110 opens, and the tape loading pin of the video tape recorder comes into the pocket 119 in the front of the case 101 to bring the tape 102 toward the front of the case. Now, in FIG. 20, a slant face 123 having step is formed on the outer surface of the front end 115a of the right side wall 115 of the case, as is located at the halfway of the wall 115. Thus, the above-mentioned space 121 is wider at its front half 121a than at its rear half 121b, as the slant face comes to its boundary. More concretely, the slant face 123 with step is formed over the total length of the upper and lower cases and is closer to the front of the case than the above-mentioned pivot hole 116. And side space, the front edge of the front end 115a is processed to form curved edge to make a guiding slant face 125 causing the space to widen toward the front of the case. The protruding base 113a of the pivot 113 protruded from the right support plate 112 of the front lid 110 is contacted with the outer side of the front end 115a to ensure a constant width at the narrower rear half 121b.

In this narrower half 121b of the space 121, the rotatable locking equipment is installed which is the means 156 for locking the front lid 110 when it is closed.

In FIGS. 20 to 22, the locking equipment 156 is composed of an arm 157 one end of which is a fulcrum 170 for rotation, a hook 160 for engaging, another arm 162 connected to the arm 157 and its part 161 for being pushed (to release locking) which is formed at its lower edge. The side wall of the space 121 which is closest to the rear of the case has the opening 163 for the insertion of a leaf spring 164 to make a match contact between the side wall 132 of the lower case 101b and the side wall 133 of the upper case 101a, and the leaf spring 164 inserted into the opening 163 presses the locking equipment 156 so that the equipment 156 turns clockwise. The locking equipment 156 is to be mounted on the lower case 101b before the fixing of the upper case 101a and this lower case are put together. Concerning the torsion spring 117, the coil 117a in its middle is installed on the above-mentioned pivot 113, one end 117b of the spring is placed in and supported by a longitudinal groove 139 provided for the outer surface of the front end 115 of the right side wall 115 of the case, and the other end 117c is laid and supported on the spring shoe 140 provided on the inner surface of the right support plate 112 of the front lid 110.

Thus, when the tape cassette is not in use, the engaging hook 160 at one end of the locking equipment engages upward with the part 167 of the front lid 110 in the closed position to securely lock the front lid 110 and prevent it from turning on the pivot 113 and opening upward. When the tape cassette with the front lid closed is inserted, the locking releaser 141 is introduced into the space 121 through a front opening 142 at the front lid 110 part and pushes the front of the part 161 of the locking equipment 156 which is to be pushed. Then, the locking equipment 156 turns anticlockwise as shown by the hypothetical line in FIG. 21, the leaf spring 164 being distorted, the hook 160 disengages from the part 167 of the front lid and then the locking of the closed front lid is released. Here, the locking equipment 156 under the presence of the above-mentioned curved guiding edge 125 and of the slant face 123 with step works effectively according as the locking releaser 141 is guided in the space 121 and correctly pushes the part 161 of the locking equipment 156 even if a cassette was loaded with a little malpositioning into a video tape recorder.

Incidentally, both the right and the left lower part of the front plate 111 of the front lid 110, where the part the tape is pulled out to the front of the case 101, as shown in FIGS. 18 and 21, are cut to make the openings 142, and projections 143 from the front edge of the bottom plate 104 of the case are formed so that the top 144 of the projections may be located in a position corresponding to the middle of the thickness of the front plate 111.

The above-mentioned tape cassette, however, has the following disadvantage in the locking equipment. The locking equipment 156 rotates round the fulcrum 170. But this fulcrum 170, as shown in FIG. 22, is placed from above in a pair of grooves 171 formed in the lower case 1b. But since it is not fastened in this position, it must be prevented from slipping out the grooves 171 by putting the upper case 1a and the lower case b together, that is, holding the fulcrum with the lower surface 101c of the upper case 101a. Therefore, in the process of assembling the tape cassette, since the locking equipment with the fulcrum 170 simply placed from above in the lower case 101b easily slips out the position by contingencies such as vibrations, a lot of care needs to be taken in this assembly process, that will lead to lower productivity.

It is therefore another object of the present invention to provide a tape cassette so constructed as to retain its lock equipment stably so that it may lead to efficient and steady assembly of the tape cassette.

SUMMARY OF THE INVENTION

To achieve the first object of the present invention, a tape cassette, which embodies the present invention, with a reel lock for locking the rotation of the tape reels has the above-mentioned reel lock installed in one half of the cassette so that it may move back and forth, and has a projection on the other half of the cassette to slide on the inner flat surface of the above-mentioned other half of the cassette.

To achieve the second object of the present invention, a tape cassette, which embodies the present invention, having a front lid for opening and closing the front of the cassette and a lock for this operation has the first and second fitting mechanisms for securing the above-mentioned lock on the lower half case of the cassette so that these fitting mechanisms may allow the above-mentioned lock to be fixed in only the above-mentioned lower half case.

BRIEF DESCRIPTION OF THE DRAWINGS

FIGS. 1 to 4 are illustrations of embodiments of the present invention:

FIG. 1(A) is an enlarged sectional view of the principal part of a tape cassette;

FIG. 1(B) is another enlarged sectional view of the above principal part;

FIG. 1(C) is an enlarged plan view of the above principal part;

FIG. 2 is an enlarged sectional view of the principal part of another tape cassette; and FIGS. 3 and 4 are an enlarged plan view and an enlarged sectional view respectively of the principal part of still another tape cassette.

FIGS. 5 to 7 are illustrations of conventional tape cassettes:

FIG. 5 is a plan view of the lower half case of a tape cassette;

FIG. 6 is an enlarged cross section of the principal part taken on line VI—VI of FIG. 5.

FIGS. 9 to 17 are illustrations of embodiments of the present invention:

FIG. 9 is an enlarged cross section of the principal part of an 8 mm video tape cassette (taken on line I—I of FIG. 11);

FIG. 10 is a cross section taken on line II—II of FIG. 11;

FIG. 11 is a plan view of the principal part of the 8 mm video tape cassette (whose upper half case is omitted);

FIG. 12 is the same section as FIG. 9 that illustrates the lock mechanism performing the locking and its release;

FIG. 13 is an elevation, plane and left side elevation of the lock mechanism;

FIG. 14 is a sectional view showing the process of mounting the lock mechanism on the lower half case;

FIG. 15 is a sectional view for an explanation of the relation in size when the lock mechanism is fit into the lower half case;

FIG. 16 is the same sectional view as FIG. 14 that illustrates another embodiment; and FIGS. 17(A) and 17(B) each are a schematic view showing the combination of the fulcrum axle of the lock and the axle groove.

FIGS. 18 to 22 are illustrations of conventional tape cassettes:

FIG. 18 is a perspective view of a tape cassette for 8 mm video tape recorder;

FIG. 19 is a partially sectional plan view of this above tape cassette;

FIG. 20 is a sectional view of the principal part of this tape cassette;

FIG. 21 is a cross section taken on line XIII—XIII of FIG. 20; and

FIG. 22 is a perspective partially cutaway view of the principal part of this tape cassette.

DETAILED DESCRIPTION OF THE PREFERRED EMBODIMENTS

Figure 5:
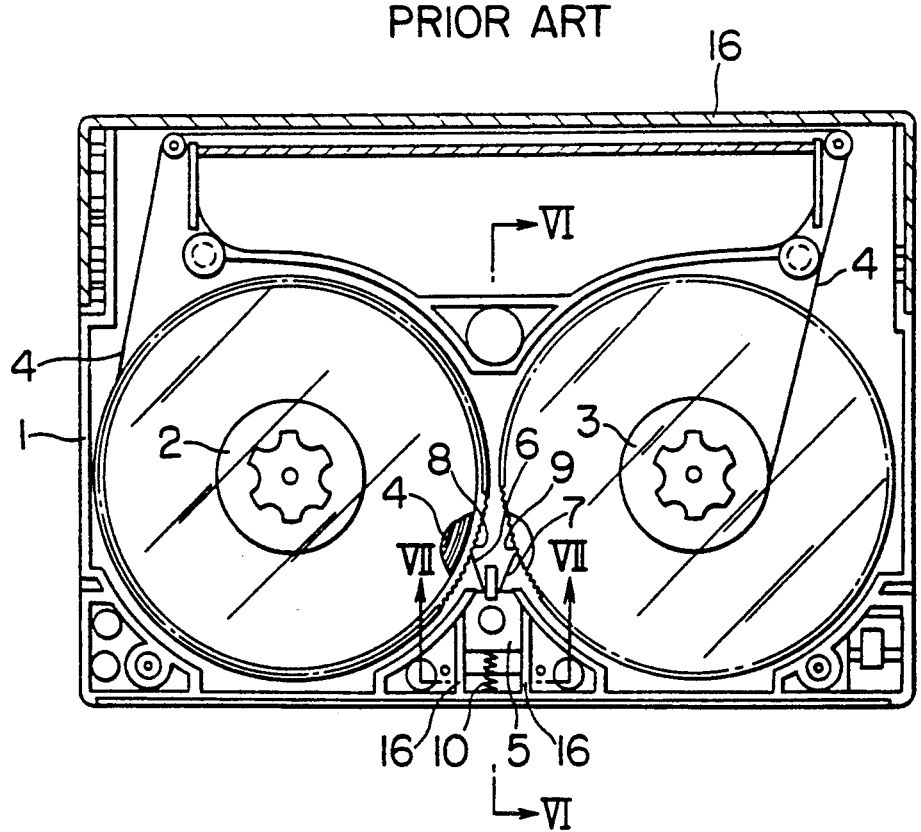
Figure 6:
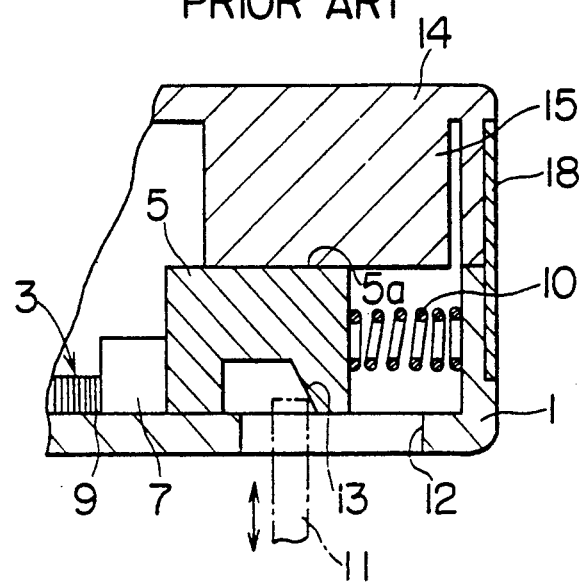
Figure 7A:
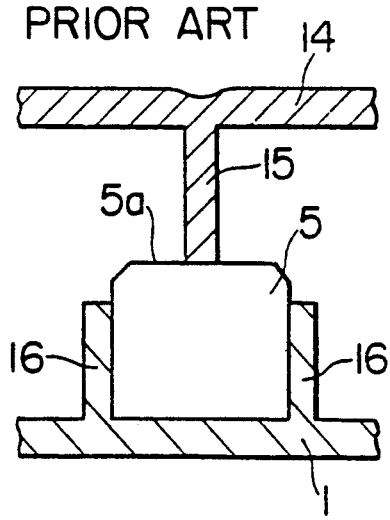
FIGS. 7(A) and 7(B) each are an enlarged cross section of the principal part of a tape cassette (taken on line VII—VII of FIG. 5).
Figure 7B:
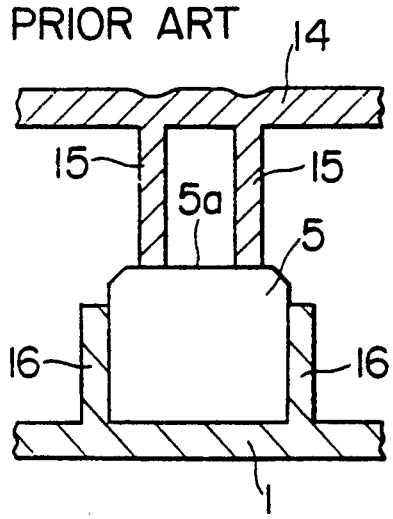

Referring now in detail to the drawings, since a video tape cassette, which embodies the present invention, for achieving the first object of the present invention has composition similar to that shown in FIGS. 5 to 7 and that in FIG. 8 except for the reel lock mechanism and its surroundings, common parts are denoted by the same numerals in these drawings, and so the description of the details is omitted.

Figure 8A:
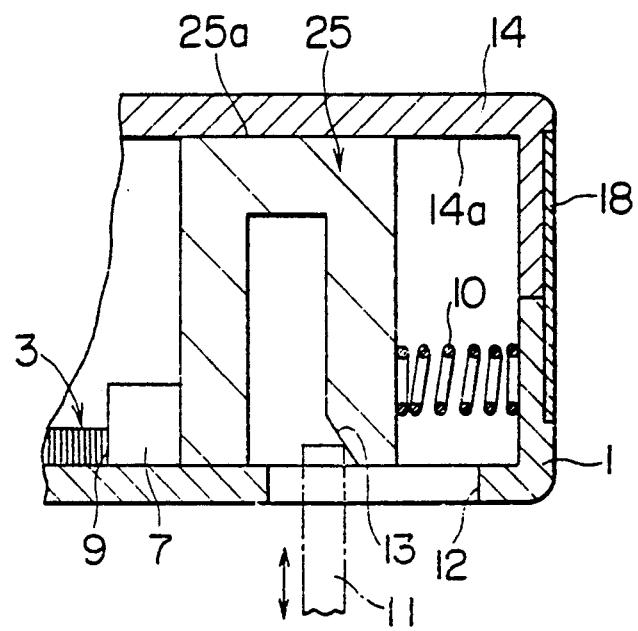
FIGS. 8(A) and 8(B) each are an enlarged sectional view of the principal part of the tape cassette for which the inventor of the present invention has already applied for a patent.
Figure 8B:
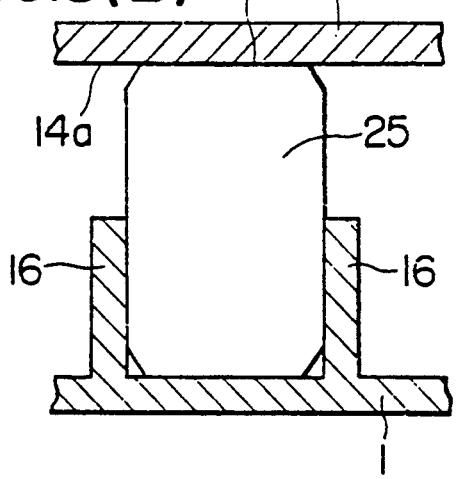
Figure 11:
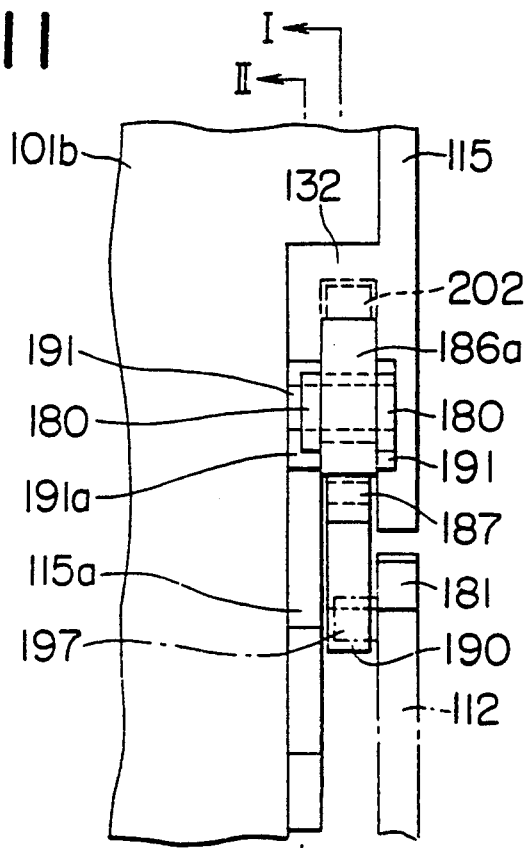

FIG. 1(A) is an enlarged sectional view of the principal part of this tape cassette, which corresponds to a cross section taken on line VI—VI of FIG. 5 or FIG. 8(A). FIG. 1(B) is also such an enlarged sectional view, which corresponds to a cross section taken on line VII—VII of FIG. 5 or FIG. 8(B). FIG. 1(C) is a plan view of the same principal part in the lower half case of the cassette.

The embodiment shown in FIG. 1 of the present invention has an upward projection 35c continuing to the body 35d of a reel lock 35 which is provided at the middle part of the body 35d at the same height 35b as the upper surface 16a of the guide ribs 16. This projection 35c is, as shown in FIG. 1(C), provided over the total length of the lock 35 as its part, and is distinctly characterized by the upper surface 35a of the projection 35c of the reel lock 35 contacting slidably with inner surface 14a of the upper half case. The height of the projection 35c is selectable, but for now about half of the overall height of the lock.

Namely, the usually applied rib 15 that restricts the height of the lock as described earlier (in reference to FIGS. 6 and 7) is not provided on the inner surface of upper half case, and the flat upper surface 35a of the projection 35c of the reel lock 35 slides on the inner surface 14a of the upper half case.

In this manner, the lock 35 of the tape cassette in this embodiment has the perpendicular projection 35c provided on the upper part of the lock 35 (i.e. toward the upper half case 14) over the total length of the lock 35 in the longitudinal direction of the cassette, so the reel lock 35 becomes lighter and smaller with the center of gravity lower than the reel lock shown in FIG. 8, and gets good stability and smooth slidability. The reel lock 35 is prevented by the projection 35c which is in contact with the upper half case 14 from slipping out upward when it slides. Here, forming the upper surface 35a of the projection and the inner surface 14a of the upper half case into flat surfaces with appropriate accuracy prevents the reel lock 21A also from rising in the direction shown by the arrow A. The inside of the reel lock 35 is a hollow 35.

In this embodiment, the preparation of the projection 35c on the reel lock 35 facilitates the fixing of the reel lock before the upper and lower half cases are put together. Namely, the fixing of the lock 35 between the guide ribs 16 of the lower half case can be done easily by holding it by such means as a finger (not illustrated) and this allows easy assembly and handling. In addition, the flatness provided in and around the inner surface 14a of the upper half case with which the reel lock contacts prevents sink mark from coming out on the outer surface of the upper half case 14, thus implementing a good appearance and enhancing the commodity value for the tape cassette. Furthermore, the flatness of the inner surface 14a makes the molding die manufacturing for the upper half case easier.

Figure 2:
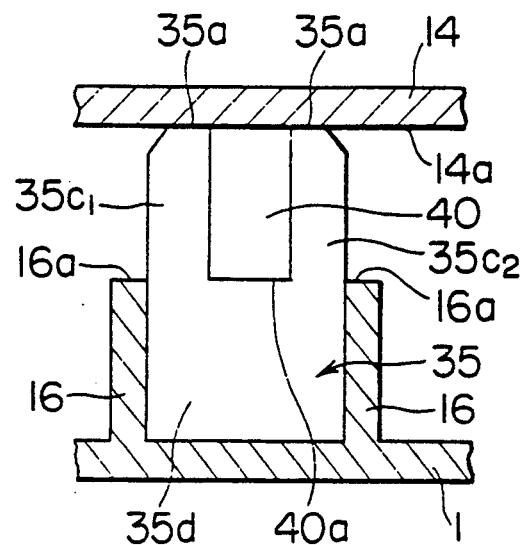

FIG. 2 is an enlarged sectional view of the principal part of the tape cassette in another embodiment, in which unlike the first embodiment the reel lock 35 has two perpendicular projections $35c_1$ and $35c_2$ on the upper surface of the reel lock 35 in longitudinal direction to the cassette and both are in contact with the inner surface 14a of the upper half case. There is a groove 40 between the projections $35c_1$ and $35c_2$, its bottom 40a is as high as the upper surface 16a of the guide ribs 16.

In this embodiment, since the projections $35c_1$ and $35c_2$ are parallel in the front or rear direction of the cassette, the reel lock 35 is capable of smooth sliding.

The reel lock 35 in this embodiment is also light, small and well stable with the low gravity center, and therefore facilitates its installation into the lower half case. In addition, the absence of retaining ribs leads to no sink mark occurring on the outer surface of the upper half case, thus helps to keep a good appearance.

Figure 3:
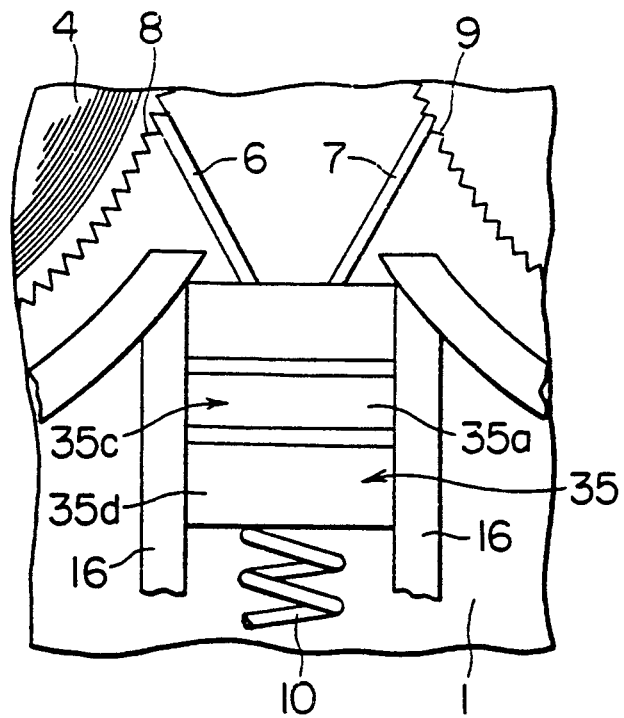

FIG. 3 is a plan view of the reel lock 35 of the tape cassette in still another embodiment, in which the reel lock 35 has a projection 35c provided parallelly to the longitudinal direction of the cassette, the upper surface 35a of the projection contacting with the inner surface 14a of the upper half the case same as in the above embodiments.

In this embodiment, the reel lock 35 is also light, small, stable and easy to fix, and gives rise to no sink mark on the outer surface of the upper half case when the half case is molded. And at the same time, the projection 35c is capable of smooth sliding on the inner surface 14a of the upper half.

Figure 4:
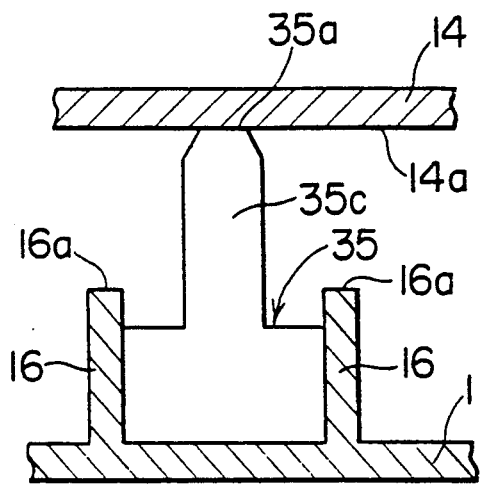

FIG. 4 is an enlarged sectional view of the reel lock 35 of the tape cassette in a further embodiment, in which the projection 35c from the reel lock 35 is formed with the bottom of the projection which is lower than the upper surfaces 16a of the guide ribs. This lowers the gravity center of the lock 35 and also makes the lock lighter.

The bottom position of the projection 35c formed in the embodiment shown in FIG. 4 may be the same as in the embodiment in FIG. 2. The projection 35c may be also formed to have a higher bottom than the upper surfaces 16a of the ribs.

The explanation of the embodiments so far for achieving the first object of the present invention was made to aid the understanding of the invention, and any variation may be made without departing from the technical scope of the present invention.

For instance, the projection of the reel lock may be changed in size, shape, number and construction. The inner surface 14a of the upper half case need not necessarily be flat. As for the method of pushing the reel lock toward the tape reel, a leaf spring may be used instead of the compression coil spring in the embodiments shown in FIGS. 1 to 7.

The present invention may be applied to other types of tape cassettes (than 8 mm video tape cassettes).

A tape cassette in accordance with the present invention prevents the reel lock from slipping out upward by providing such a projection on the reel lock part as slides on the inner surface of the other cassette half case, and ensures stopping the rotation of the tape reels and releasing such locking.

The preparation of this projection allows the lock to be light and small and its center of gravity to be low, implementing stable operation. In addition, since the projection gives a convenient grip for assembly work, the reel lock is easy to handle and install into the half case.

Furthermore, since the presence of the above-mentioned projection eliminates the need for any retaining rib on the other cassette half case, the appearance of sink marks is essentially eliminated on the outer surface of the upper half case, maintaining a good appearance and thus enhancing the commodity value.

Referring now to FIGS. 9 to 15, there is shown an 8 mm video tape cassette, which embodies the present invention, for achieving the second object of the present invention. In this embodiment, some details which are similar to those shown in FIGS. 18 to 22 are denoted by the same numerals as used in these drawings, and so the description of the details is omitted (which applies also to other embodiments for achieving the second object of the present invention).

In this tape cassette, unlike the conventional one described earlier, the lock 186 for locking the front lid 110 is so constructed as to be not rotatable (i.e. without a fulcrum axle for rotation) and can be set in the half case with the locking capability by its own elasticity.

Figure 13:
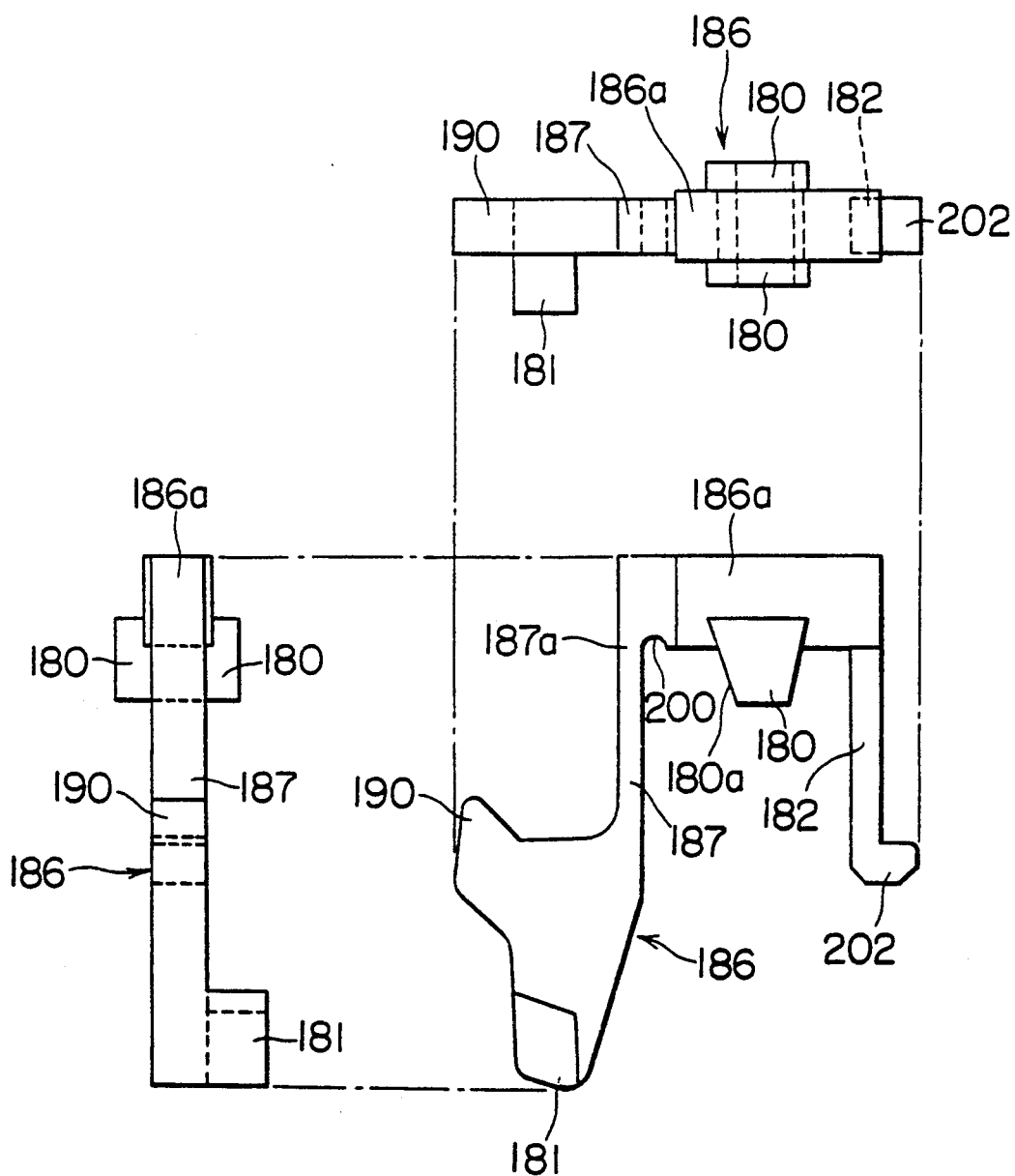
Figure 18:
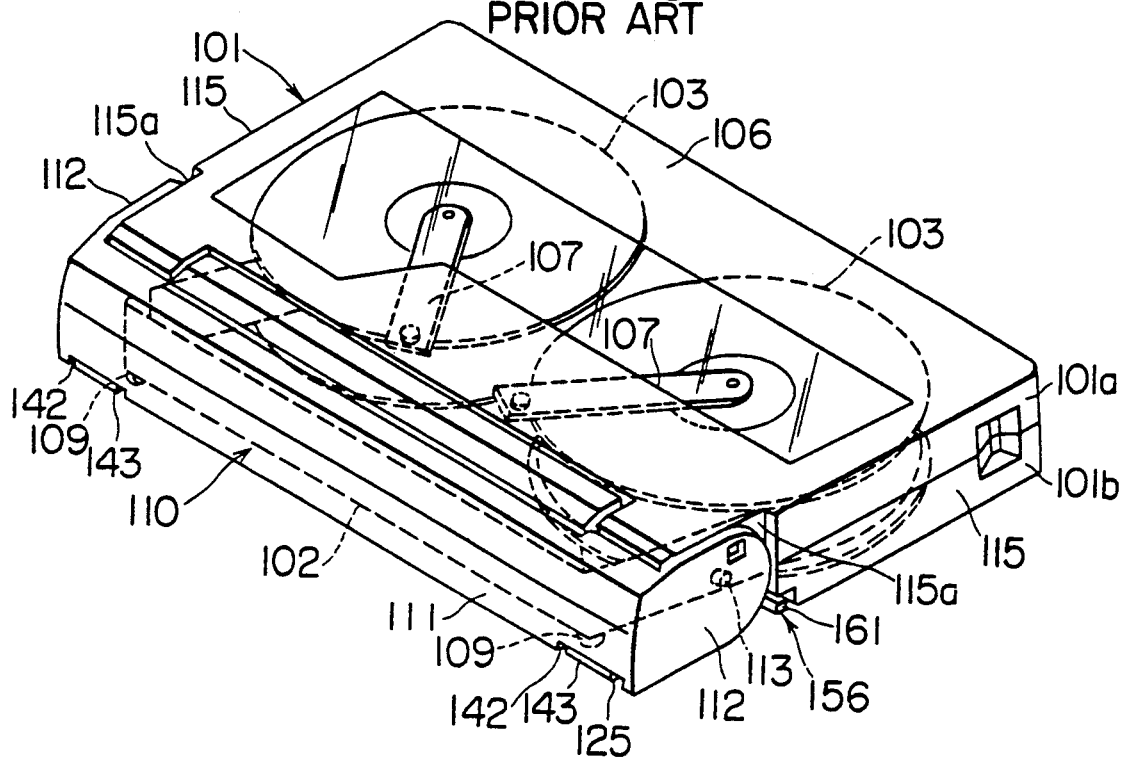
Figure 19:
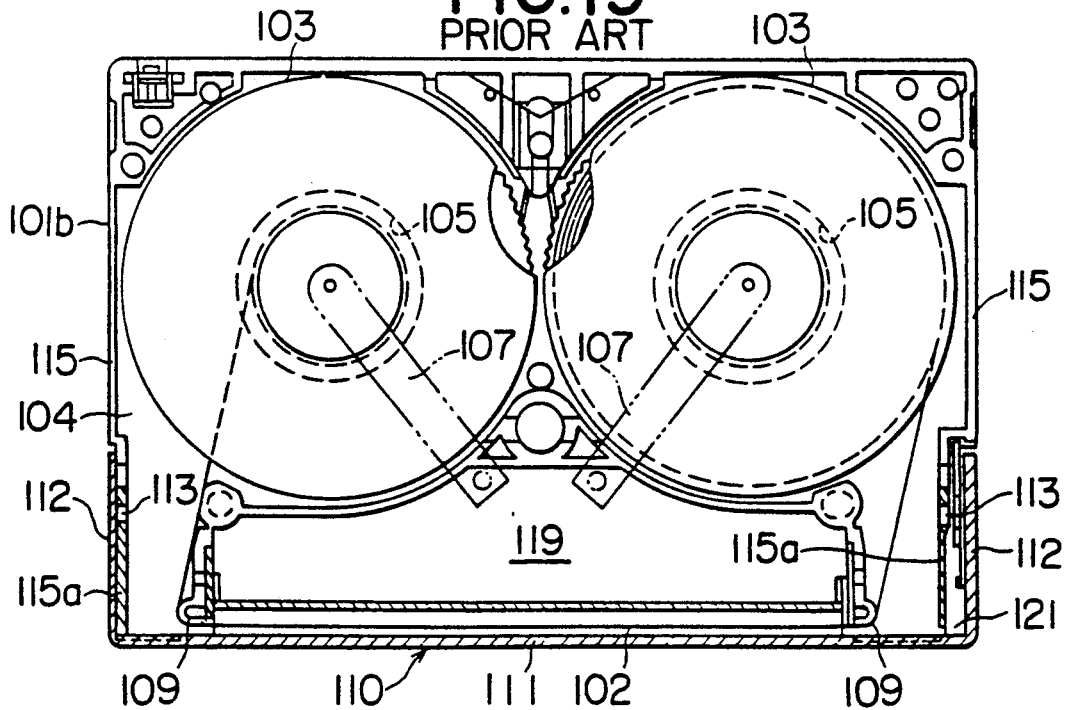
Figure 22:
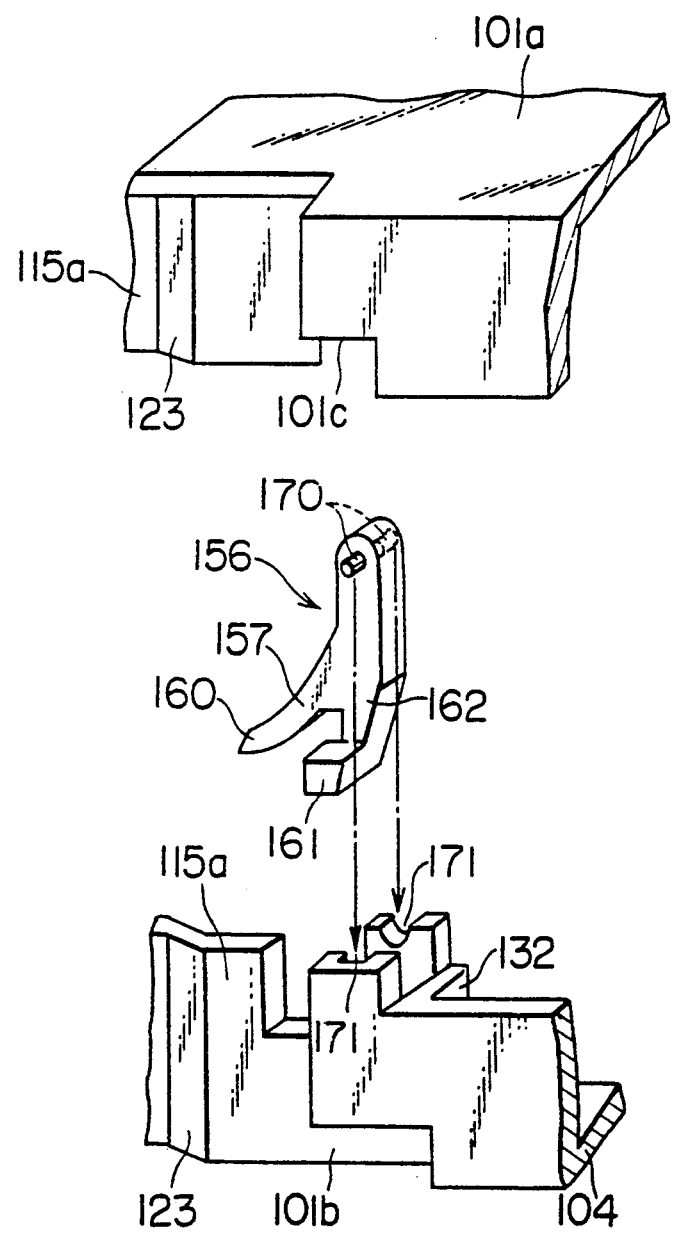

As shown somewhat enlarged in FIG. 13, this lock 186 has projecting fulcrums 180a, shaped like tapering trapezoids, for being inserted into similarly shaped (but larger) grooves 191 formed as bearings in the lower half case 1b. And on the front surface of the upper part 186a of the lock 186 situated on the fulcrum 180, an arm 187 which extends downward almost vertically is formed as part of the lock 186 so that the arm 187 may be able to cause elastic deformation in the longitudinal direction at the root 187a of the arm 187. At the lower end of the arm 187, are a part 181 for being pushed and a hook 190 for engaging with the ratchet 197 protruded from the front lid side plate 110. A small recess 200 is formed at the root 187a to make the elastic deformation of the arm 187 easier and its reliability (durability) higher. In the rear of this lock 186, another arm 182 extending almost vertically from the upper part 186a is molded, somewhat deformable elastically, as a part of the lock 186. The end of the arm 182 bends at almost right angle toward the rear of the cassette to make a bent part 202 for fitting with the overhung step 201 (shown in FIG. 9) formed on the wall of the lower half case 1b. The lock 186 may be formed of, for instance, such a material with sufficient abrasion resistance and strength as polyoxymethylene.

In FIGS. 9 to 12 components such as the spring 117 described earlier are, of course, provided in this embodiment though omitted in the drawings.

Now, in reference to FIG. 14, the method of fixing the lock 186 in the assembly process of the tape cassette will be described.

First, the lock 186 is fixed in the manner shown in FIG. 14 from above the lower half case and 1b, and the fulcrum 180 is slid into the groove 191 on the lower half case 1b from above. Here, the lock part 186 is inserted in a manner to make the bent part 202 contact with the surface 132a of a wall 132 and to make the slant face 180a of the fulcrum 180 contact with the slant face 191a of the groove 191. A part of the fulcrum 180 is now in the groove 191 and contacts with the slant face 191a. Accordingly, the locating of the lock has already been undertaken.

When the lock 186 is pushed downward from above, the fulcrum 180 slides down along the slant face 191a of the groove 191, and the bent part 202 slides down on the surface 132a, the arm 182 elastically deforms to curve a little toward the front side of the cassette receiving the pressure from the surface 132a.

When the lock 186 is pushed to the extent that the fulcrum 180 reaches around the bottom of the groove 191 and that the bent part 202 comes to the step 201, the bent part 202 fits into the step 201 immediately by the restoring force due to the elasticity of the part 202, resulting in the position of the lock 186 as shown in FIG. 9. The idea is that the bent part 202 fit into the step 201 (locks) prevents the lock 186 from slipping out upward. At the same time, inserted deeply and fit into the groove of the same shape, the fulcrum 180 (i.e. the lock 186) is not incorrectly located both vertically and horizontally.

In this manner, the lock 186 is inserted only by placing it down on the lower half case 1b and then pushing it. And the lock 186 can be fixed only on the lower half case 1b itself. As the lock 186 has been fixed firmly on the lower half case 1b before the process that the upper half case 1a will be put on the lower half case 1a, assembly process can be proceeded stably without the slip off of the lock 186. This makes assembly process management easier and more efficient.

Figure 12:
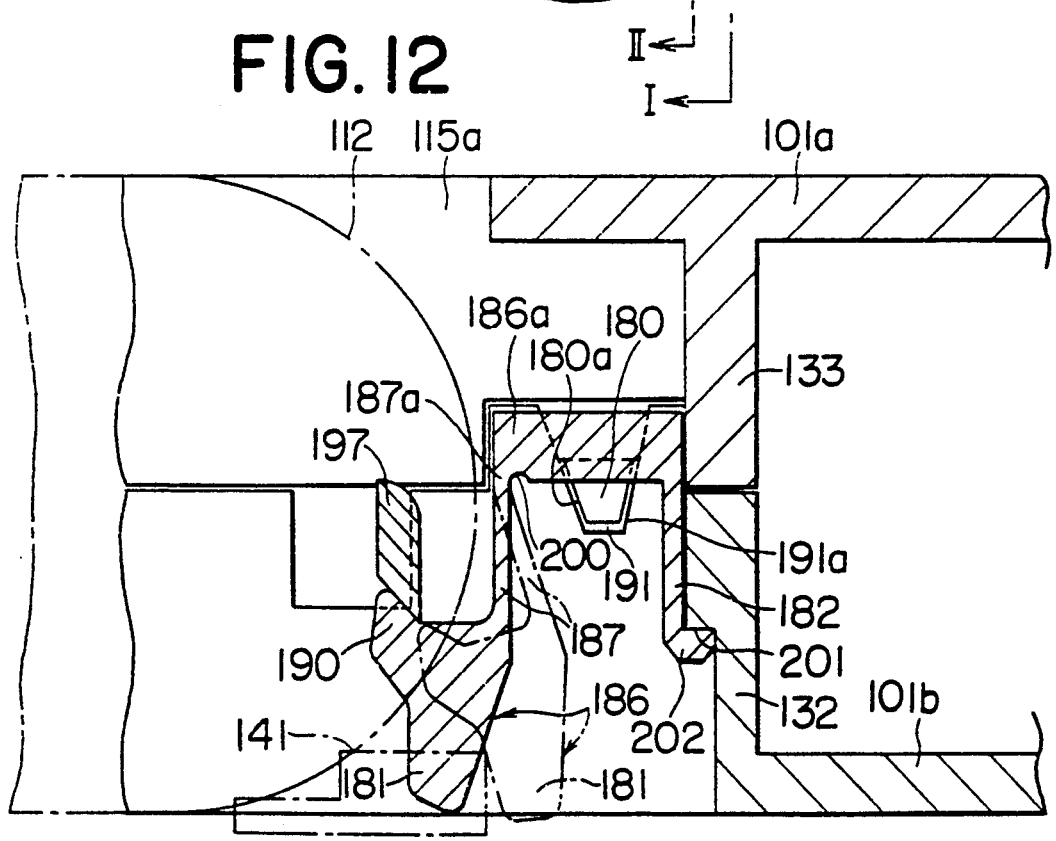

After assembly of the tape cassette, when the tape cassette is in use, the locking hook 190 of the lock 186 comes from under and engages tight with the ratchet 197 of the front lid side plate 112 in order to lock the front lid as shown in FIG. 12.

On the occasion of releasing such locking, the locking releaser 141 pushes the part 181 as shown by the chained line, the hook 190 above the part 181 disengages from the ratchet 197 by the elastic deformation of the arm 187 which curves toward the rear of the cassette. This elastic deformation is preferably the shape of a bow.

As understood from the above, in the locking and the releasing by the lock 186, the elastic deformation and restoring force of the arm 187 are used effectively, and that the location of the supporting point for this deformation (i.e. the root 187a) is apart from the position of the fulcrum axle 180 ensures smoothness for the deformation as well as fixing stability for the lock 186 as a whole.

FIG. 15 shows the relation in size between the lock 186 and its bearing, the groove 191 in the lower half case. In this figure, the following reference characters are used:
- a: upper ends of the groove 191
- b: upper face of the fulcrum 180 fixed
- c: standard plane for the lock fixed
- d: lower face of the fulcrum 180 fixed (the lower face of the fulcrum 180)

Now, the locations of these points and planes will be specified in order to perfect the insertion and fixing of the lock which are described in reference to FIG. 14. When the upper ends a higher than the upper face b and the lower face d is lower than the standard plane c, on the occasion of inserting and fixing the lock 186 there is no possibility of the fulcrum 180 slipping off upward from the groove 191, and after pushing the lock the fulcrum is held stable.

In addition, as described earlier, the same shape taken by the fulcrum 180 and the groove 191 helps to secure the positional accuracy of the lock especially in the longitudinal direction to the cassette after the fulcrum is fixed in the groove. In this respect, the clearance, shown by e and f in FIG. 15, between the sides of the fulcrum 180 and of the groove 191 is preferably not more than 0.2 mm. This is the result of considering that the size error of not more than 0.1 mm occurring in the molding process, a maximum of 0.2 mm to the above clearance is needed. The clearance of not more than 0.2 mm provides a firm fixing and causes no looseness.

FIG. 16 shows another embodiment which is different from the first embodiment in that the fulcrum 180 and the groove 191 have the shape of a triangle with a side up. This also allows fixing the lock 186.

In addition to the above, the fulcrum 180 and groove 191 may take various shapes, such as a rectangle shown in FIG. 17(A) and a figure with a curved bottom shown in FIG. 17(B).

The embodiments so far described for achieving the second object of the present invention are included merely to aid in the understanding of the invention, and variations may be made without departing from the technical scope of the present invention.

For instance, the above-described two fitting mechanisms may be changed in shape and location. More than two fitting mechanisms may be adopted. The key requirement for the present invention, however, is that each fixing is provided at different locations so as to secure the positional stability of the lock on the half lower case three-dimensionally. It is preferable to position the fulcrum at a position on the lock that is apart from the supporting point for the elastic deformation of the arm. Among the above-mentioned fitting mechanisms, the step 201 may be changed in its location and shape. For instance, the step may be at a location higher than that described and may be shaped like a hole, or it may be not a step but a projection to be fit into the part of the lock. As the elastical deforming means for giving a force to the lock, though formed as a part of the lock itself in the above embodiments, a separate elastical deforming part (such as a leaf spring) may be connected to the lock or may be fixed on the lower half case as in conventional mechanisms. Furthermore, the shapes of the locking part and the locking release part and their ways of engaging and contact may also be changed. The locking releaser 141 may have various shapes, and the direction in which it comes in may be changed. In addition to all the above, the present invention is applicable to other kinds of tape cassettes.

As understood from the above, since a tape cassette in accordance with the present invention has the lock fixed on the lower half case itself by adopting the two fixing mechanisms, even in the process of assembling the tape cassette the lock is held stable on the lower half case and is sure not to slip off from the lower half case as is often the case in conventional tape cassettes, which facilitates assembly process management and boosts assembly efficiency.

What is claimed is:

1. A tape cassette comprising:
   a combined upper half case and lower half case in which a pair of tape reels, around which a roll of tape is wound, is accommodated;
   a front lid for opening and closing a first side of said cassette,
   a lock member for locking said front lid, said lock member having a first fitting member and a second fitting member for providing two fitting positions between said lock member and said lower half case;
   said first fitting member being adapted to fit into a corresponding complimentary recess in said lower half case by movement in a fitting direction in relation to said lower half case to position said lock member in said lower half case;
   said second fitting member being arranged to interlock with a corresponding step portion formed on said lower case to prevent said first fitting member from moving in a direction opposite to said fitting direction whereby said lock member is fixed to said lower half case before said lower half case is combined with said upper half case to form said cassette.

2. The tape cassette of claim 1 wherein said locking member comprises a center portion on which said first fitting member is formed, a first extension arm on a first end of said center portion, and a second extension arm on said opposite end of said center portion, a locking claw being formed at a terminal portion of said first extension arm for locking said front lid in an open or closed position, said second fitting member being provided on a terminal end of said second extension arm for engaging a corresponding step portion formed in said lower half case of said tape cassette, said lower half case being provided with a recess into which said first fitting member is fitted in a fitting direction, thereby positioning said engaging claw in a position to engage said front lid, whereby when said first fitting member is moved in said fitting direction to engage said corresponding recess, said second fitting member engages the corresponding step portion in said lower half case, preventing said lock member from being withdrawn in a direction opposite to said fitting direction.

* * * * *